March 11, 1958  D. F. HASTINGS  2,826,064
TRANSMISSION TORQUE SENSOR
Filed Feb. 18, 1954
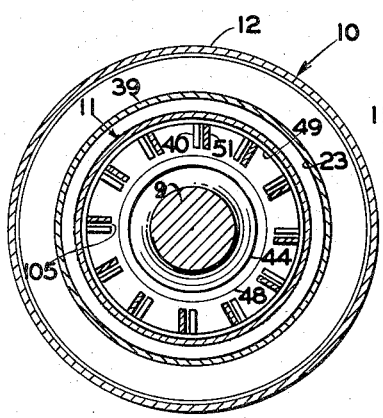
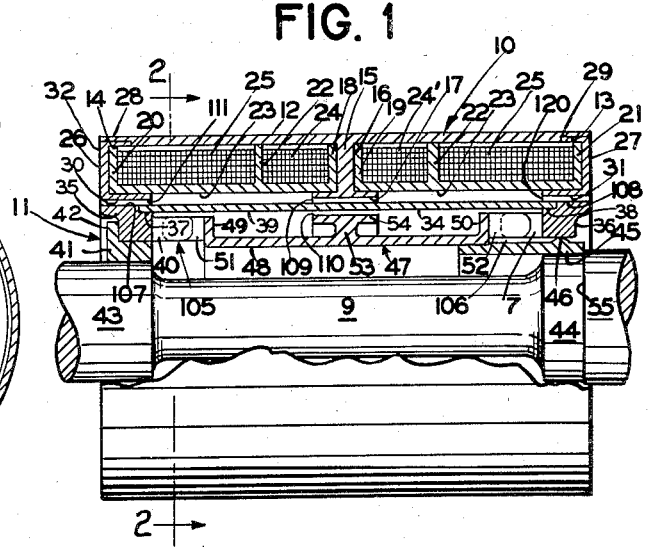
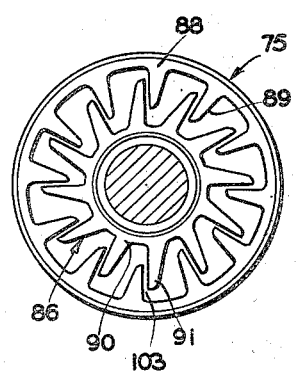
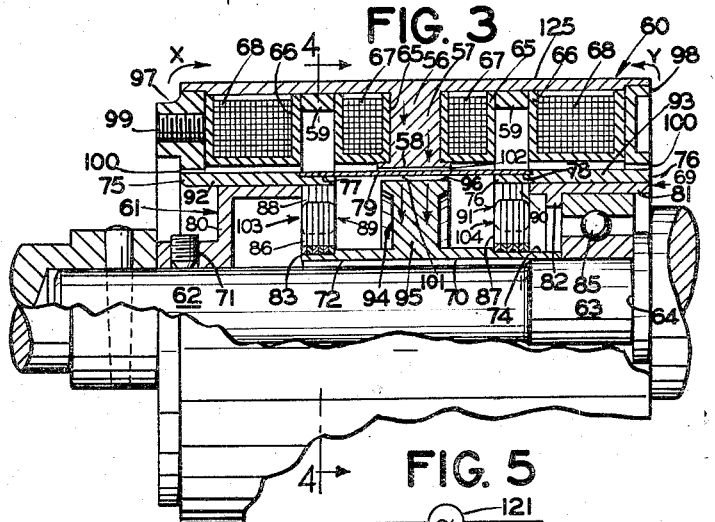
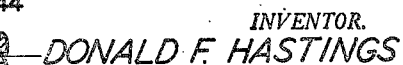
INVENTOR.
DONALD F. HASTINGS
BY
ATTORNEY United States Patent Office
2,826,064
Patented Mar. 11, 1958

2,826,064

TRANSMISSION TORQUE SENSOR

Donald F. Hastings, Suffern, N. Y., assignor to Bendix Aviation Corporation, Teterboro, N. J., a corporation of Delaware Application February 18, 1954, Serial No. 411,204

12 Claims. (Cl. 73—136)

The present invention relates in general to electro-magnetic devices and more particularly to devices of this type adaptable for use in measuring mechanical strain resulting from torque.

Torque measuring or sensing devices of the type to which this invention pertains produce an electrical quantity which is indicative of the extent of mechanical strain impressed upon the shaft to be measured.

One of the factors governing the design of a strain measuring device or torque sensor is the permissive usable space for installation of the unit. Consequently, this restriction on overall size of the unit is a design factor which must be considered in conjunction with the required sensitivity for obtaining the optimum results. Moreover, it is desirable to obtain the maximum efficiency and sensitivity of the torque sensor for a given amount of material used in its manufacture, and yet obtain a compact unit that will be capable of withstanding shock, vibration and other stresses while operating satisfactorily.

Electromagnetic torque measuring devices of the type to which this invention pertains have coil windings on a stationary form which is concentrically positioned with respect to a rotor assembly having spaced elements of magnetizable material to provide air gaps for varying the magnetic reluctances of the magnetic circuits, whereby the resultant impedance variation of the windings and its resultant voltages produce a measurable voltage indicative of the torsional deflection of the shaft coupled to the rotor assembly.

Devices of this general type having two variable air gaps, heretofore manufactured, have used a variable reluctance rotor with three mechanical references for the flux paths, one at each end of the shaft to be measured, and a third midway between the ends of the shaft. The present invention obtains twice the efficiency of a comparable device using three mechanical references, yet this invention employs only two mechanical references.

It is an object of the present invention to provide a novel electromagnetic torque sensor which has approximately double the efficiency of comparable devices for a given quantity and quality of materials used in its manufacture.

Another object of the invention is the provision of a novel device for measuring the torque of a shaft under strain, which device will be highly sensitive to torsional deflection for given small gauge lengths of shafts.

A further object of the present invention is to provide a novel torque measuring device which will be compact, sturdy and efficient yet adaptable for use where space for installation is limited.

A further object of the present invention is to provide a novel torque sensor having comparable dual flux paths while using only two mechanical references embracing the entire length of the shaft to be measured.

A further object of the invention is the provision of a torque measuring device having magnetic circuits including dual air gaps for varying the magnetic reluctance of the magnetic circuits, the angular displacement of each air gap being equal to the angular displacement of the total gauge length of shaft to be measured.

The present invention contemplates a torque measuring device having a stator with flux producing windings and a variable reluctance rotor utilizing a multiplicity of left and right hand pairs of elements providing air gaps for varying the magnetic reluctance of the magnetic circuits, and the consequent variance of the impedance of the windings, thereby varying the output voltage accordingly which is a measure of the torsional deflection of the shaft.

While an annular flange of magnetizable material is part of the rotor assembly, and is positioned midway between pairs of elements forming air gaps, said annular flange is unitarily formed with one element of each pair of elements forming air gaps and is secured to one end of the length of shaft to be measured, while the other of said elements of said pairs of elements forming air gaps is unitarily formed and secured to the opposite end of the length of shaft to be measured, thereby providing two regions of mechanical reference, one region being adjacent to one end of the shaft and the other region being adjacent to the opposite end of the shaft. The angular displacement of one pair of elements forming an air gap is equal to the angular displacement of the gauge length of shaft to be measured. The annular flange provides dual flux paths, yet it is not used as a mechanical reference.

The foregoing and other objects and advantages of the invention will appear more fully hereinafter from a consideration of the detailed description which follows, taken together with the accompanying drawing wherein two embodiments of the invention are illustrated by way of example. It is to be expressly understood, however, that the drawing is for the purpose of illustration and description only, and is not intended as a definition of the limits of the invention.

In the drawings:

Fig. 1 is a longitudinal view partially in section showing one form of the device having axially disposed air gap elements constructed in accordance with the principles of the invention.

Fig. 2 is a cross sectional view taken along lines 2—2 of Fig. 2.

Fig. 3 is a partial sectional view illustrating a modification of the invention having radially disposed air gap elements.

Fig. 4 is a cross-sectional view taken along lines 4—4 of Fig. 3.

Fig. 5 is a schematic diagram of one form of the electrical circuit.

Fig. 6 is a diagrammatic representation of the elements forming the air gaps and the relative connections to the rotor shaft.

Referring to the drawings and more particularly to Figs. 1 and 3, there is shown two forms of the invention. Both forms of the invention use a stator having windings thereon to provide magnetic flux, which flows through the flux paths of a rotor having relatively displaceable elements of magnetic material for varying the magnetic flux linkages across the displaceable elements, thereby causing a varying voltage in the windings indicative of the torque of a shaft being measured.

The displaceable elements which provide the two variable air gaps include two pairs of paired torque rings. Each pair of paired torque rings includes an outer torque ring and an inner torque ring. Projections on each torque ring provide a number of teeth or fingers for interlocking relation with complemental teeth or fingers on an adjacent torque ring so that each tooth has a face portion confronting the face portion of a complemental tooth on an adjacent ring. Each pair of torque rings thereby provide a number of uniform variable flux paths, or small air gaps, formed by the complemental teeth on adjacent torque rings, there being two pairs of torque rings, one pair spaced from the other axially on the rotor shaft.

Comparing Fig. 1 and Fig. 3, generally, the former shows axially disposed projections forming variable flux paths, which provide air gaps, while the latter shows the projections radially disposed on its respective rotor shaft.

A torque sensor shown in Fig. 1 has a stator 10 and a rotor 11. The stator has an annular shell 12 which has undercut portions 13 and 14 on either end thereof. A central flange 15, having a rib 16 and a face 17, is formed intermediate the ends of the shell which is made of magnetizable material. Two coil forms 18 and 19, respectively, each have outer end walls 20 and 21, and a partition 22, each of which is formed unitarily with its respective base portions 23.

Primary windings or coils 24—24', and secondary windings or coils 25—25', are positioned in the annular compartments provided by the two coil forms. End rings 26 and 27 are made of magnetizable material and each have, respectively, an upper flange 28 and 29, a lower flange having faces 30 and 31, and end walls 32 and 33. The coil forms with their windings thereon are inserted within the shell. The inner edges of the coil forms abut the flange 15 on opposite sides thereof, while the end rings 26 and 27, respectively, engage the end walls 20 and 21 of said coil forms. The upper flanges 28 and 29 of the end rings engage, respectively, the undercut portions 14 and 13 which are formed in said shell portion, and by way of a press-fit, hold the coil forms securely in position in relation to the shell of the stator.

The rotor 11 has an outer structure 34 including a left hand torque ring 35, with a plurality of axially extending fingers 40, and a right hand torque ring 36, each with a plurality of axially extending fingers 7, with undercut portions 37 and 38, respectively, to receive the opposing ends of a shell 39 formed of non-magnetic material, such as brass. The torque rings are secured by a press-fit to said shell so that the torque rings will remain aligned and rotate simultaneously. A bushing 41 having a flange 42 is made of non-magnetic material, such as brass, and is pressed tightly on the left hand shaft hub 43, with the flange 42 abutting the outer surface of the left hand torque ring 35. The right hand shaft hub 44 has securely pressed thereon a bushing 45 formed of non-magnetic material, such as brass, with an annular ridge 46 formed on the outer surface of the bushing to provide a suitable bearing surface for the right hand torque ring since there must be relative movement between the inner and outer rotor structures upon angular displacement of the gauge length shaft to be measured.

Both of the outer torque rings 35 and 36, and the brass shell 39 are secured together, and with the bushing 41 form the outer rotor structure which is held in the rigid connection with the left hand shaft hub 43. The brass bushing 41 has a press-fit in the torque ring 35 and on hub 43.

The inner structure 47 of the rotor 11, comprises an axially disposed sleeve 48 which terminates in left and right hand radially extending flanges, and with their respective fingers form inner torque rings 49 and 50, respectively. On the torque rings of the inner rotor structure are disposed a plurality of left and right hand projections or fingers 51 and 52, respectively. The sleeve 48 also has an annular central flange 53 intermediate its ends, and said flange includes a face 54 which is the same width as the complemental face 17 of the stator annular central flange 15, both of said flanges providing flux paths for the magnetic circuits.

The brass bushing 45 which is secured to the right hand hub shaft 44 by means of a press fit has one end abutting a shoulder 55 of the shaft. An outer surface portion of the opposite end of the bushing has an undercut portion which forms a shoulder which engages a lower edge of the shell 48 of the inner structure 47. The entire inner rotor structure 47 including the bushing 45, is thereby secured to the right hand shaft hub 44, with the hubs 43 and 44 providing mechanical references for the outer and inner structures of the rotor, respectively.

From the foregoing it will be seen that if the right hand shaft hub 44 is held stationary, which in turn holds the inner structure 47 stationary, and sufficient turning effort is applied to the left hand shaft hub 43, the outer structure 34 which is secured to the left hand shaft hub will be torsionally or angularly displaced.

Accordingly, torsional strain, causing a circumferential displacement on the section of shaft to be measured intermediate the hubs 43 and 44, will cause an equal circumferential displacement between the inner structure and outer structure of the rotor carried, respectively, by said shaft hubs, and a consequent circumferential displacement of the elements forming the air gaps 105 and 106, respectively, between the confronting faces of the fingers carried by left hand and right hand pairs of torque rings.

The modification shown in Figs. 3 and 4 has an annular stator assembly 60 disposed about an annular rotor assembly 61. The rotor assembly has an outer rotor structure 69 which is secured to the left hand shaft portion 62 by any suitable means, such as a screw 71. The inner rotor structure 70 of the rotor assembly 61 has a center sleeve 72 provided with undercuts 73 and 74, respectively, formed on the left and right hand ends of the sleeve, the right hand end of the sleeve 72 being secured on the shaft hub 63 by a press-fit. A shoulder 64 on the shaft is used as a limiting means for a bearing assembly contiguous with said shoulder and one end of said sleeve.

The outer rotor structure 69 has left and right hand outer torque rings 75 and 76, including their projections or fingers, respectively, with undercut portions 77 and 78 to receive an outer sleeve. A torque ring uniting sleeve 79 made of non-magnetic material, such as brass, is an interrupted annulus and is secured to the undercut portions 77 and 78 of the left and right hand outer torque rings 75 and 76. The left hand torque ring 75 of the rotor structure, is secured by means of a press-fit to a Z-shape annular mounting sleeve 80, which, in turn, is secured to the left hand shaft portion 62 by said screws. The right hand outer torque ring 76 is secured, by a press-fit, to a mounting sleeve 81 which is made of a non-magnetic material, such as brass. An annular flange 82 extends inwardly of the mounting sleeve and acts as a limiting means engaging the outer race 83 of the bearing assembly, while the inner race 84 of the bearing assembly is positioned on the hub 63 of the shaft with opposing side surfaces engaging the shoulder 64 formed on the shaft, and one end of the sleeve 72 of the inner rotor structure. A plurality of balls, one being shown representatively, are positioned between the inner and outer races in a conventional manner.

Each left and right hand outer torque ring 75 and 76, respectively, comprise an annular ring 92 and 93, and a plurality of finger laminations. Each lamination of the left hand outer torque ring 75 has a body portion 88 and a plurality of radially disposed inwardly extending teeth 89. The right hand outer torque ring 76, including its laminations, is identical with the outer torque ring 75, including its laminations, but is turned around and oppositely positioned when mounted.

The left hand inner torque ring comprises a plurality of finger laminations, each having an annular body portion 90 and a plurality of teeth 91, the teeth being radially disposed and extending inwardly. The right hand inner torque ring 87 is identical with the left hand inner torque ring 86, but is turned around and oppositely positioned when mounted.

The laminations of the left and right hand outer torque rings are secured to their respective annular rings by means of a press-fit. The laminations forming the left and right hand inner torque rings are secured, by means of a press-fit, adjacent to the ends of center sleeve 72 by way of the undercuts 73 and 74. Any angular displacement of the shaft to be measured, between the right hand hub 63 and the left hand end 62 of the shaft will cause a corresponding variation of air gaps 103 and 104.

The center sleeve 72 of the inner rotor structure has an annular central flange 94 midway between the left hand and right hand inner torque rings, said flange having a rib 95 and a face 96.

The stator 60 has a shell 125 with an annular central flange 56 positioned internally thereof midway between its ends. The central flange has a rib 57 and a face 58, said face being parallel with the face 96 of the flange carried as part of the inner rotor structure. A circular air gap 102 is formed between the flange face 58 and the interrupted annular brass uniting sleeve 79. Said sleeve 79 of the flange face 58 of the outer rotor structure is spaced from the flange face 58 of the stator, to permit free rotation of the rotor within the stator. The brass uniting sleeve 79 of the outer rotor structure is also spaced from the flange face 96 of the inner rotor structure to permit freedom of movement between said inner and outer rotor structures, thereby providing a circular air gap 101. Relative movement between the inner and outer rotor structure is a function of the torque of the shaft to be measured.

The stator 60 has annular coil forms 65 and secondary coil forms 66, which carry the coils of the primary windings 67 and the secondary windings 68, respectively. A spacer 69 is placed between each of the primary and secondary winding coil forms, said coil forms and spacers being securely positioned in place within the shell 125 by the end rings 97 and 98, each of which have a press-fit in its respective end of said shell. The end ring 97 has one or more threaded holes 99 therein which are used for mounting screws which retain the stator in a stationary predetermined position on some suitable supporting structure, in relation to the rotor. While Fig. 3 shows the end rings 97 and 98 as being different from each other, the end rings may be similar. One important factor in determining the particular end ring conformation is the dimensions of their inner faces which should be identical for best results since they are part of the magnetic circuits. Since said inner faces are each equidistantly spaced from the left and right hand annular torque rings 92 and 93, respectively, the air gaps 100 therebetween provide equal circular flux paths for the magnetic circuits, which circuits must be perfectly balanced to get the best null.

Referring to Figs. 3 and 4, there is shown an air gap 103 between the confronting face areas of adjacent pairs of teeth 89 and 91 formed, respectively, by the toothed laminations of the left hand outer and inner torque rings 75 and 86. A similar but oppositely formed air gap 104 is provided by the confronting face areas of adjacent pairs of teeth carried by the right hand outer and inner torque rings 76 and 87.

Referring to Fig. 1, there is shown an air gap 105 between the confronting face areas of adjacent pairs of fingers 40 and 51, respectively, on the left hand outer torque ring 36 and the left hand inner torque ring formed by radial flange 49. An air gap 106 is provided by the confronting face areas of adjacent pairs of fingers 7 and 52, respectively, on the right hand outer torque ring 35, and the right hand inner torque ring formed by radial flange 50. An air gap 109 is formed between the rotor shell 39 and the face 17 of the stator central flange to permit relative motion between the stator assembly and the rotor assembly. Another air gap 110 between the rotor shell 39 of the outer rotor structure and the face 54 of the central flange of the inner rotor structure permits relative motion therebetween when the shaft to be measured is undergoing torsional strain. The air gaps are circular, and are defined in the magnetic circuit by the parallel faces of the complemental annular central flanges. Air gap 111 is formed between the face 30 of the left hand end ring lower flange, and the face 107 of the left hand torque ring 36. An air gap 120 is also formed between the face 31 of the right hand end ring lower flange, and the face 108 of the right hand torque ring 35, both of said air gaps being circular.

Fig. 6 is a representative diagram for more simply showing the flux paths and the relative interaction between the inner rotor structure 47 and the outer rotor structure 34 of the rotor assembly 11. While the reference numerals pertain to Figs. 1 and 2, they also may represent equivalent parts shown in Figs. 3 and 4. The dash dot line represents the axis of the shaft to be measured having thereon left and right hand hubs 43 and 44, respectively.

The outer rotor structure shows the brass shell 39 secured between the left hand and right hand outer torque rings 35 and 36 which carry, respectively, fingers 40 and 7, so that both of the outer torque rings and their respective outer fingers will rotate as a single mechanical unit. Both of said outer torque rings are secured to the left hand hub 43 by way of the brass bushing 41.

The inner rotor structure shows the sleeve 48 secured to the left hand and right hand inner torque rings 49 and 50, which carry, respectively, inner fingers 51 and 52, so that both of the inner torque rings and inner fingers will rotate as a single mechanical unit. Both of the inner torque rings are secured to the right hand hub 44 by way of the brass bushing 45.

Variable reluctance paths are provided by the fingers positioned adjacent the left hand hub 43, which form air gap 105, while fingers which form air gap 106 are positioned adjacent the right hand hub 44. Any circumferential displacement of the shaft between the hubs 43 and 44, with a corresponding circumferential or angular displacement of the outer torque rings relative to the inner torque rings, will move the adjacent interlocking fingers carried by their respective torque rings on one end of the shaft, away from each other, while moving the adjacent interlocking fingers carried by the pair of torque rings on the other end of the shaft closer to each other. Accordingly, twisting of the shaft will increase the air gaps between the confronting faces of the fingers of one set of torque rings, and decrease the air gaps between the confronting faces of the fingers of the other set of torque rings, thereby varying the reluctance of the respective magnetic circuits when the electromagnetic device is energized.

The number of fingers on the outer torque rings are equal to each other, and there is a complemental finger on each of the inner torque rings for each of the fingers on the outer torque rings. Consequently, each finger of the outer torque rings has a face portion complementary to a face portion of each finger of the adjacent inner torque rings, said confronting face portions of complementary pairs of fingers being in close proximity to each other and forming an air gap therebetween. Consequently, the inner and outer complemental torque rings provide one overall air gap for that particular pair of torque rings, and the same is true for the other pair of torque rings. Therefore, it may be said that each pair of complemental torque rings has one air gap for varying the reluctance of its respective magnetic circuit.

The stator shell 12, in Fig. 6 shows representative end rings having faces 30 and 31 positioned, respectively, opposite the outer torque rings having faces 107 and 108, forming air gaps 111 and 120. The stator center flange face 17 and the rotor central flange face 54 are positioned on opposite sides of the brass sleeve 39, thereby forming one combined flux path across air gaps 109 and 110 which may be referred to as air gap 109—110.

One form of electrical circuit which may be used with the device is shown in Fig. 5 wherein the winding of the primary coils 24 and 24' are connected in series with a source of alternating voltage 121. The windings of the secondary coils 25 and 25' are connected in series opposition with an output indicating means 122, which may be a voltmeter. Upon suitable energization of the primary coils, the magnetic flux linked with those coils will be induced to flow in the magnetic circuits provided in the stator and rotor assemblies. When the primary coils 24 and 24' are energized by an alternating voltage source, a voltage is induced in the coils of each of the secondaries 25 and 25', respectively, the flux coupling providing two magnetic flux paths which are additive in the instantaneous directions indicated by the arrows X and Y.

One of the magnetic circuits include stator shell 12, central flange 15 having face 17, the rotor central flange 53 having face 54, inner sleeve 48, inner torque ring 50 having fingers 52, air gap 106, fingers 7 of an outer torque ring 35, which in turn has a face 108, air gap 120 and stator end ring having face 31, which ring is connected to the stator shell 12.

The other magnetic circuit includes stator shell 12, central flange 15 having face 17, the rotor central flange 53 having face 54, inner sleeve 48, inner torque ring 49 having fingers 51, air gap 105, fingers 40 on outer torque ring 36 which in turn has face 107, air gap 111, and stator end ring having face 30, which ring is connected to the stator shell 12. The complemental central flanges of the stator and rotor, shown in Figs. 1 and 3, in each view, provide common element for each of the dual magnetic circuits, the resultant fluxes therein, at any instant, is at no time in bucking relation.

The end air gaps 111 and 120, and the central air gap 109–110 are formed between uninterrupted annular faces, with each face carried by the rotor being evenly spaced from its complemental face carried by the stator. The central flanges of the stator and the rotor include portions which provide flux paths of both magnetic circuits, one magnetic circuit being complemental to the left hand primary and secondary windings, and being complemental to the right hand primary and secondary windings. Since the air gaps between the stator and rotor are constant at all times, there will be no change in the flux density thereacross for any given excitation voltage. However, when the shaft to be measured is under torsional strain and there is a twisting action in the shaft intermediate the mounting bushings, such as 41 and 45, there will be a corresponding change in the air gaps such as 105 and 106. As the air gap 105 increases, the air gap 106 will decrease. Accordingly, as all of the air gaps between the fingers of one pair of complemental inner and outer torque rings increase, the air gaps between the fingers of the other pair of complemental inner and outer torque rings will decrease, and the coils of the secondary windings will respond only to the changes in flux density across these air gaps. The meter 122 will respond to voltages induced in the secondary winding. The output voltage indicated on the meter 122 will vary with a variation in the air gaps between the torque ring fingers or projections, and this voltage will be a direct indication of the amount of torsional strain, or torque, on the length of shaft to be measured.

In the present invention, when there is no twisting or angular displacement between the ends of the shaft to be measured, the shaft is said to be at zero torque. When the primary coils of the torque sensor are energized by a suitable source of alternating voltage, and the shaft is at zero torque, there are voltages generated in both of the secondary windings but the voltages are not measurable because of the series opposition connection of the secondaries, and the voltages, being equal and opposite, buck out each other, and there is no meter indication. So, at zero torque there is zero output of the torque indicating means or meter.

However, when there is any circumferential or angular displacement of the gauge length shaft to be measured, one set of air gaps adjacent to one end of the shaft will increase, and the other set of air gaps adjacent to the other end of the shaft will decrease. Accordingly, as the air gaps vary the reluctance of one of said magnetic circuits will increase and that of the other magnetic circuits will decrease, and accordingly, one secondary winding voltage will decrease and the other secondary winding voltage will increase, respectively, which produces a net measurable difference in voltage which is a function of the torque of the shaft intermediate a first and a second region thereof, said regions being also a first and a second mechanical reference.

While specific modes of securing together the various parts has been set forth, obviously many other modes of fastening may be employed. The circuitry as shown in Fig. 5 is one specific arrangement of electrical connections, but it is clear that other convenient and suitable circuits would also work with the device. Further, certain parts made of non-magnetic material, such as brass, could be made of "Teflon," or of one of numerous suitable non-magnetic materials.

From the foregoing it will be seen that the outer torque ring and its adjacent inner torque ring, with their respective interlocked fingers, provide elements for a combined air gap for varying the reluctance of one magnetic circuit, and the other outer torque ring and its adjacent inner torque ring, with their respective interlocked fingers, provide elements for a second combined air gap for varying the reluctance of the other of said magnetic circuits. Consequently, each of the two magnetic circuits have an independent variable air gap for controlling the electrical output from the winding of its respective secondary coil. Because of the series opposition connection of the two secondary coils when energized, the resultant net difference voltage is an indication of the angular displacement of the shaft of the torque sensor device.

Further, it will be seen that when the windings of the torque sensor are energized and the reluctance of the two variable air gaps are equal, the magnetic circuits are balanced and there will be no indication on the output meter. This condition obtains at zero torque. However, whenever any angular displacement of the shaft occurs, thereby increasing the lengths of one of the air gaps and decreasing the other accordingly, the respective magnetic circuits become unbalanced. Accordingly, the voltage in the two respective secondary circuits become unbalanced, resulting in a net difference voltage which is a function of the torque of the shaft, and which may be measured by a suitable measuring device, such as a voltmeter.

The two outer torque rings and the two inner torque rings, with their respective fingers, are made of magnetizable material. The two outer torque rings are securely mechanically united by an interrupted annulus of non-magnetizable material to form the outer rotor structure. The two inner torque rings are formed or mechanically united by a sleeve of magnetizable material having a central flange to form the inner rotor structure. The rotor assembly includes the outer rotor structure which is secured to one end of the shaft to be measured, and the inner rotor structure which is secured to the opposite end of said shaft. When the rotor assembly and the energized stator assembly are properly installed as a complete torque sensor unit in accordance with the foregoing and when the shaft is undergoing torsional strain, each of the two air gaps, in its respective angular displacement, is indicative of the total angular displacement of the gauge lengths of shaft to be measured.

By using only the opposite ends of the shaft as mechanical references for electrical comparison of the angular displacement of the elements forming the two air gaps, the device of the present invention will double the sensitivity of a comparable device using a mechanical reference intermediate the ends of the shafts to be measured.

Although but two embodiments of the invention have been illustrated and described in detail, it is to be expressly understood that the invention is not limited thereto. Various changes can be made in the design and arrangements of the parts without departing from the spirit and scope of the invention as the same will now be understood by those skilled in the art.

I claim:

1. In an electro-magnetic device for indicating the torque of a shaft, in combination, a stationary member, a rotor assembly having an outer structure secured to a first region of a shaft and including a first and a second outer torque ring, and an inner structure secured to a second region of the shaft and including a first and a second inner torque ring, the first outer torque ring and the first inner torque ring being disposed adjacent each other, and the second outer torque ring and the second inner torque ring also being disposed adjacent each other, said outer structure and inner structure being relatively displaceable, an electrical output circuit responsive to the sum of the effects of the shaft deflections, means for producing an alternating magnetic flux interlinking said stationary member and said torque rings of said outer and inner structures, said outer and inner structures being relatively displaced upon angular displacement of the shaft intermediate said first and said second end regions, thereby varying the value of the flux linkage of said relatively displaceable structures in an amount indicative of the torque of the shaft, whereby the measured values are the sum of the effects of the shaft angular deflections at the first and second regions, and means for indicating said value.

2. In an electro-magnetic device for indicating the torque of a shaft, in combination, a stationary member including a shell, a central flange and end ring portions of magnetizable material; a rotor assembly, said assembly having an outer structure secured to a first end region of a shaft and including a torque ring of magnetizable material at either end thereof, an inner structure secured to a second end region of the shaft and including a torque ring at either end thereof and a central flange of magnetizable material, said central flange being complemental to said central flange of the stationary member, said outer structure and said inner structure being relatively displaceable, an electrical output circuit responsive to the sum of the effects of the shaft deflections, means for producing an alternating magnetic flux interlinking said stationary member and said relatively displaceable outer and inner structures, said structures being relatively displaced upon angular displacement of the shaft intermediate said first and said second end regions, thereby varying the value of the flux linkage of said relatively displaceable structures in an amount indicative of the torque of the shaft, whereby the measured values are the sum of the effects of the shaft angular deflections at the first and second regions, and means for indicating said value.

3. In a device for sensing the torsional loading of a gauge length shaft comprising, the combination of, a stationary electromagnetic unit having input terminals for energization thereof, an outer and an inner rotor structure secured to the shaft and being relatively displaceable, each of said structures including two torque rings spaced from one another, each torque ring of said outer structure being complemental to a torque ring of said inner structure and including projecting portions thereby forming two discrete airgaps, the outer structure being secured to a first region of the shaft and the inner structure being secured to a second region of the shaft, whereby the angular displacement of said structures forming said discrete airgaps are equal to the angular displacement of the shaft intermediate said first and second regions, whereby the measured values are the sum of the effects of the shaft angular deflections at the first and second regions, and means connected to the output of said electromagnetic unit indicative of the torsional loading of the shaft when a suitable source of energy is connected to said input terminals.

4. A device for sensing the torsional strain of a shaft, comprising a pair of magnetic circuits each having means for varying its reluctance including a pair of relatively movable elements, one element of each means being connected to one region of the shaft and the other element of each means being connected to another region of the shaft so that upon torsional displacement of one region of the shaft relative to the other region of the shaft, the elements of each means are moved relative to one another an amount equal to the torsional displacement of the shaft between said regions and the reluctances of the magnetic circuits are varied.

5. A device for sensing the relative torsional displacement of a first and a second region of a shaft, comprising a pair of magnetic circuits each having means for varying its reluctance including a pair of relatively movable elements, one element of each means being connected to one region of the shaft and the other element of each means being connected to the other region of the shaft so that upon torsional displacement of one region of the shaft relative to the other region of the shaft, the elements of each means are moved relative to one another an amount equal to the torsional displacement of the shaft between said regions and the reluctances of the magnetic circuits are varied, and electromagnetic means for energizing the magnetic circuits.

6. A device for indicating the torsional strain of a shaft, comprising a pair of balanced magnetic circuits each having means for varying its reluctance including a pair of relatively movable elements, one element of each structure being connected to one region of the shaft and the other element of each structure being connected to another region of the shaft so that upon torsional displacement of one region of the shaft relative to the other region of the shaft, the elements of each means are moved relative to one another an amount equal to the torsional displacement of the shaft between said regions and the reluctances of the magnetic circuits are varied differentially to unbalance the magnetic circuits, electromagnetic means for energizing the magnetic circuits, and indicating means connected to the electromagnetic means to indicate the torsional strain of the shaft in accordance with unbalance of the magnetic circuits.

7. A device for indicating the torsional strain of a gauge length of shaft, comprising a pair of magnetic circuits each having means for varying its reluctance including a pair of relatively movable elements, one element of each means being connected to one end of the gauge length of shaft and the other element of each means being connected to the opposite end of the gauge length of shaft so that upon torsional displacement of one end of the gauge length of shaft relative to the other end the elements of each means are moved relative to one another an amount equal to the torsional displacement of the gauge length of shaft and the reluctances of the magnetic circuits are varied, the elements of one means being moved in a direction to increase the reluctance of the associated magnetic circuit and the elements of the other means being moved relative to one another in a direction to decrease the reluctance of the associated magnetic circuit, and indicating means responsive to the sum of the variations in the magnetic circuits.

8. A device for sensing the torsional strain of a gauge length of shaft, comprising two balanced magnetic circuits each having a variable air gap structure including a pair of relatively movable elements, one element of each structure being connected to one end of the gauge length of shaft and the other element of each structure being connected to the opposite end of the gauge length of shaft so that upon torsional displacement of one end of the gauge length of shaft relative to the other end, the elements of each structure are moved relative to one another an amount equal to the torsional displacement of the gauge length of shaft and the air gaps are varied differentially to unbalance the magnetic circuits.

9. A device for sensing the torsional strain of a shaft, comprising a pair of magnetic circuits each having a variable air gap structure including a pair of relatively movable elements with closely associated projecting portions forming the air gaps therebetween, one element of each structure being connected to one region of the shaft and the other element of each structure being connected to another region of the shaft so that upon torsional displacement of one region of the shaft relative to the other region of the shaft the elements of each structure are moved relative to one another an amount equal to the torsional displacement of the shaft between said regions and the air gaps are varied to unbalance the magnetic circuits.

10. A device for sensing the torsional strain of a shaft, comprising a pair of balanced magnetic circuits each having means for varying its reluctance including a pair of relatively movable elements, one element of each means being connected to one region of the shaft and the other element of each means being connected to another region of the shaft so that upon torsional displacement of one region of the shaft relative to the other region of the shaft, the elements of each means are moved relative to one another an amount equal to the torsional displacement of the shaft between said regions and the reluctances of the magnetic circuits are varied differentially to unbalance the magnetic circuits.

11. A device for sensing the torsional strain of a gauge length of shaft, comprising a pair of magnetic circuits each having means for varying its reluctance, one portion of each variable reluctance means being connected to one end of the gauge length of shaft and another portion of each variable reluctance means being connected to the other end of the gauge length of shaft and the portions of each means being arranged to vary the reluctance of the associated magnetic circuit upon torsional displacement of one end of the gauge length of shaft relative to the other end an amount corresponding to the total displacement, and an electrical output circuit responsive to the sum of the changes in reluctance of the magnetic circuits.

12. A device for sensing the torsional strain of a gauge length of shaft, comprising a pair of balanced magnetic circuits each having means for varying its reluctance, one portion of each variable reluctance means being connected to one end of the gauge length of shaft and another portion of each variable reluctance means being connected to the other end of the gauge length of shaft and the portions of each means being arranged to vary the reluctance to the associated magnetic circuit upon torsional displacement of one end of the gauge length of shaft relative to the other end an amount corresponding to the total displacement, and an electrical output circuit responsive differentially to the sum of the changes in reluctance of the magnetic circuits.

References Cited in the file of this patent

UNITED STATES PATENTS

| | | |
|---|---|---|
| 2,173,039 | Muir | Sept. 12, 1939 |
| 2,457,700 | Martin et al. | Dec. 28, 1948 |
| 2,482,477 | Godsey | Sept. 20, 1949 |
| 2,498,282 | Langer | Feb. 21, 1950 |